US011962923B2

(12) United States Patent
Jang

(10) Patent No.: US 11,962,923 B2
(45) Date of Patent: Apr. 16, 2024

(54) IMAGE PROCESSING SYSTEM AND METHOD OF OPERATING THE SAME

(71) Applicant: SK hynix Inc., Icheon-si (KR)

(72) Inventor: Cheol Jon Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 22 days.

(21) Appl. No.: 17/683,000

(22) Filed: Feb. 28, 2022

(65) Prior Publication Data

US 2023/0076522 A1 Mar. 9, 2023

(30) Foreign Application Priority Data

Sep. 9, 2021 (KR) .................. 10-2021-0120293

(51) Int. Cl.
*H04N 25/67* (2023.01)
*H04N 25/671* (2023.01)

(52) U.S. Cl.
CPC .................. *H04N 25/671* (2023.01)

(58) Field of Classification Search
CPC .................................................. H04N 25/671
See application file for complete search history.

(56) References Cited

U.S. PATENT DOCUMENTS

2011/0268354 A1* 11/2011 Muninder .............. H04N 1/624
382/164

FOREIGN PATENT DOCUMENTS

KR    1020070066466 A    6/2007
KR    1020180041441 A    4/2018

* cited by examiner

*Primary Examiner* — Twyler L Haskins
*Assistant Examiner* — Fayez A Bhuiyan
(74) *Attorney, Agent, or Firm* — WILLIAM PARK & ASSOCIATES LTD.

(57) ABSTRACT

An image processing device includes a target pixel detector configured to detect a plurality of target pixels in which noise is generated among a plurality of pixels included in an image sensor. The image processing device also includes a target pixel corrector configured to change target pixel values, which are pixel values of the plurality of target pixels, by using average pixel values of neighboring pixels included in a preset range based on a position of each of the plurality of target pixels. The image processing device further includes a target pixel compensator configured to compensate for the target pixel values by using an accumulation value obtained by accumulating values corresponding to a decimal fraction part of the average pixel values.

21 Claims, 9 Drawing Sheets

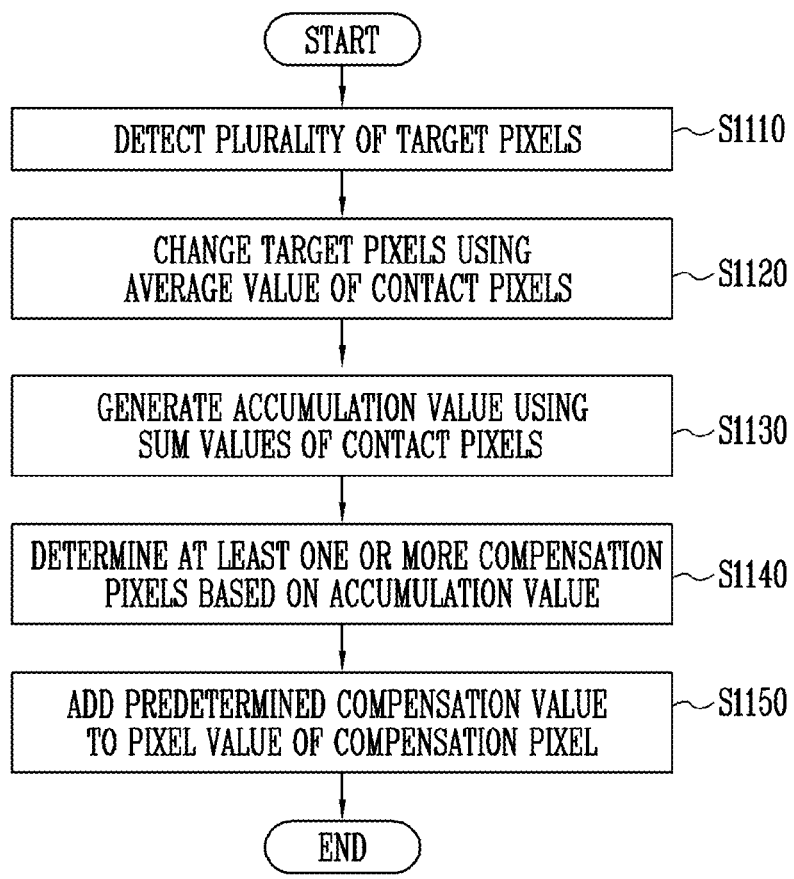

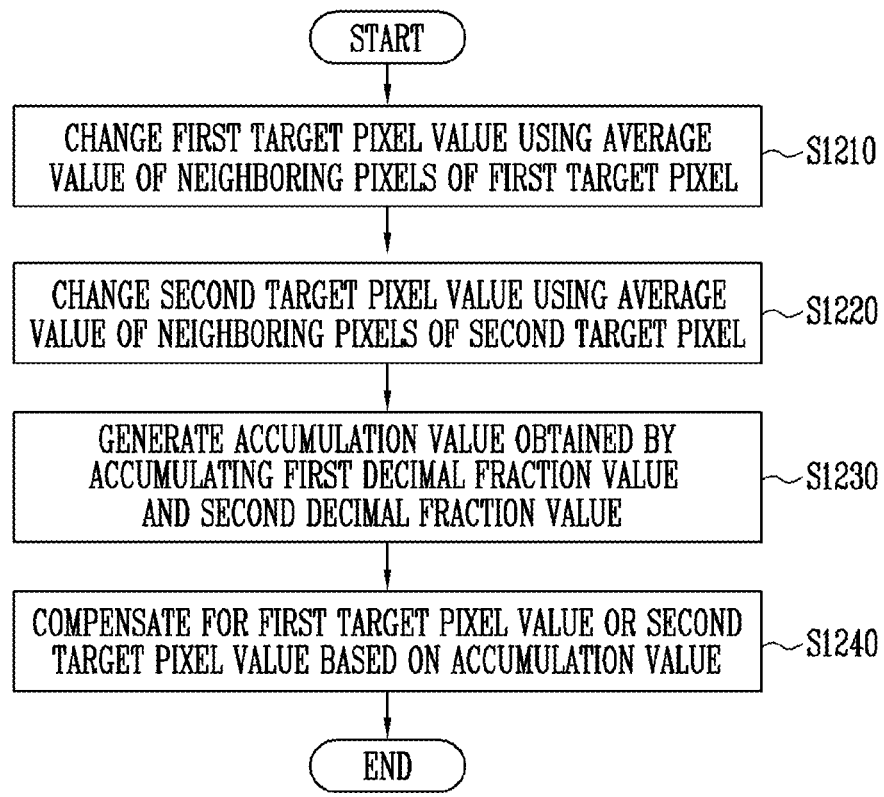
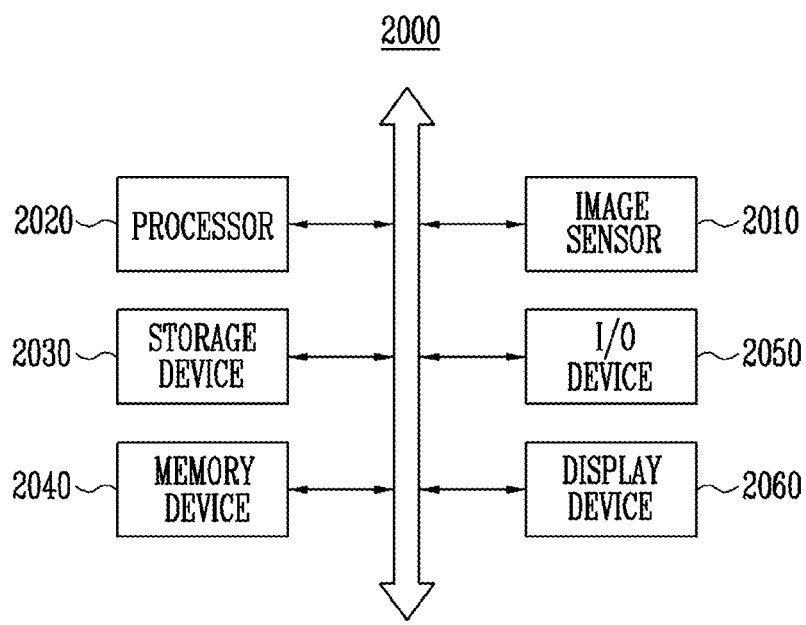

IMAGE PROCESSING SYSTEM AND METHOD OF OPERATING THE SAME

CROSS-REFERENCE TO RELATED APPLICATION

The present application claims priority under 35 U.S.C. § 119(a) to Korean patent application number 10-2021-0120293, filed on Sep. 9, 2021, in the Korean Intellectual Property Office, the entire disclosure of which is incorporated herein by reference.

BACKGROUND

1. Technical Field

The present disclosure relates to an image processing system, and more particularly, to an image processing system and a method of operating the same.

2. Related Art

An image sensor is a device that captures an image by using a semiconductor that reacts to light. Recently, with developments in the computer industry and communication industry, demand for an image sensor with improved performance is increasing for various products such as smartphones, digital cameras, game devices, Internet of things, robots, security cameras, and medical micro cameras.

An image sensor may be generally classified as a charge coupled device (CCD) image sensor or a complementary metal oxide semiconductor (CMOS) image sensor. A CCD image sensor has less noise and better image quality than the CMOS image sensor. However, a CMOS image sensor has a simple driving method and may be implemented for various scanning methods. In addition, because a CMOS image sensor may be integrated with a signal processing circuit on a single chip, miniaturization of products is easy, power consumption is very low, and because CMOS process technology may be used interchangeably, manufacturing costs are low. Recently, CMOS image sensing systems have been increasingly used for mobile devices.

SUMMARY

An embodiment of the present disclosure provides an image processing system and a method of operating the same for maintaining an average pixel value of an image even after noise generated in the image is removed.

According to an embodiment of the present disclosure, an image processing device may include: a target pixel detector configured to detect a plurality of target pixels in which noise is generated among a plurality of pixels included in an image sensor; a target pixel corrector configured to change target pixel values, which are pixel values of the plurality of target pixels, by using average pixel values of neighboring pixels included in a preset range based on a position of each of the plurality of target pixels; and a target pixel compensator configured to compensate for the target pixel values by using an accumulation value obtained by accumulating values corresponding to a decimal fraction part of the average values.

According to an embodiment of the present disclosure, an image processing device may include: a target pixel detector configured to detect a plurality of target pixels in which noise is generated among a plurality of pixels included in an image sensor; a target pixel corrector configured to change target pixel values, which are pixel values of the plurality of target pixels, by using average pixel values of contact pixels contacted in a horizontal direction based on a position of each of the plurality of target pixels; and a target pixel compensator configured to compensate for the target pixel values based on sum values of the pixel values of the contact pixels.

According to an embodiment of the present disclosure, a method of operating an image processing device may include: receiving pixel values of a plurality of pixels indicating an image; changing pixel value of a first target pixel by using an average pixel value of neighboring pixels included in a predetermined range of the first target pixel in which noise is generated among the plurality of pixels; obtaining a first decimal fraction value which is a value corresponding to a decimal fraction part of an average value corresponding to the first target pixel; changing a pixel value of a second target pixel by using an average pixel value of neighboring pixels included in a predetermined range of the second target pixel in which the noise is generated among the plurality of pixels; generating an accumulation value obtained by accumulating a second decimal fraction value which is a value corresponding to a decimal fraction part of an average value corresponding to the second target pixel and the first decimal fraction value; and compensating for the pixel value of the first target pixel or the pixel value of the second target pixel based on the accumulation value.

According to an embodiment of the present disclosure, a method of operating an image processing device may include: receiving pixel values of a plurality of pixels indicating an image; detecting a plurality of target pixels in which noise is generated among the plurality of pixels; calculating sum values of pixel values of contact pixels contacted in a vertical direction based on a position of each of the plurality of target pixels; changing target pixel values, which are pixel values of the plurality of target pixels, by using respective average values of the sum values; generating an accumulation value increased by one (1) in response to odd sum values among the sum values; determining a target pixel corresponding to a sum value obtained by increasing the accumulation value from an odd number to an even number among the plurality of target pixels, as a compensation pixel; and adding a predetermined compensation value to the pixel value of the compensation pixel.

According to an embodiment of the present disclosure, an image processing device may include: an image sensor configured to transmit pixel values of first pixels indicating an image; a target pixel detector configured to detect second pixels in which noise is generated among the first pixels based on the pixel values of the first pixels; a target pixel corrector configured to change target pixel values, which are pixel values of the second pixels, by using average pixel values of third pixels respectively determined according to positions of the second pixels in the image; a target pixel compensator configured to compensate for the target pixel values using an accumulation value obtained by accumulating values corresponding to a decimal fraction part of the average values; and an output manager configured to output the pixel values of the first pixels including the second pixels in which the pixel values are compensated.

According to an embodiment of the present disclosure, an image processing system for maintaining an average pixel value of an image even after noise generated in the image is removed may be provided.

BRIEF DESCRIPTION OF THE DRAWINGS

FIG. 11 is a flowchart illustrating a method of compensating for a pixel value of a target pixel changed based on an accumulation value according to another embodiment of the present disclosure.

FIG. 12 is a flowchart illustrating a method of compensating for a pixel value of a target pixel according to still another embodiment of the present disclosure.

FIG. 13 is a block diagram illustrating a computing system including an image sensor according to an embodiment of the present disclosure.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Hereinafter, in order to describe the disclosure in detail enough that a person of ordinary skill in the art to which the present disclosure pertains may implement the technical spirit of the present disclosure, an embodiment of the present disclosure is described with reference to the accompanying drawings.

Figure 1:
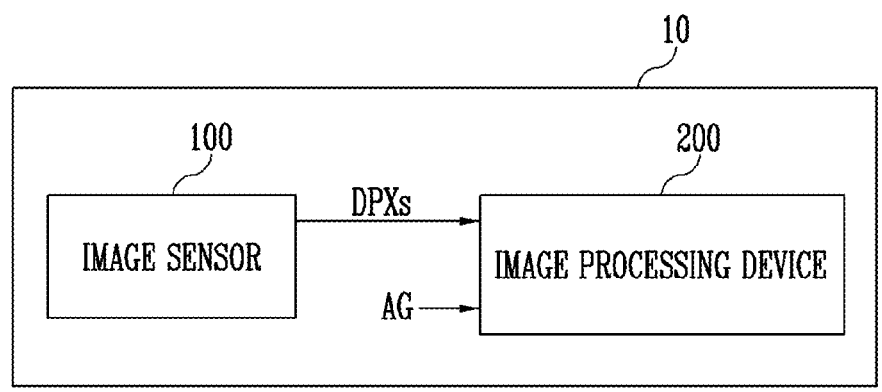
FIG. 1 is a diagram illustrating an image processing system according to an embodiment of the present disclosure.

FIG. 1 is a diagram illustrating an image processing system according to an embodiment of the present disclosure.

Referring to FIG. 1, an image processing system 10 may include an image sensor 100 and an image processing device 200.

The image processing system 10 may obtain an image. In addition, the image processing system 10 may store, display, or output an output image obtained by processing the image to an external device. The image processing system 10 may output the output image to a host according to a request of the host.

In an embodiment, the image processing system 10 may be implemented in a form of a packaged module, a part, or the like. In this case, the image processing system 10 may be mounted on the host. The host may be implemented as one of various electronic devices. For example, the host may be implemented as a digital camera, a mobile device, a smart phone, a personal computer (PC), a tablet PC, a notebook, a personal digital assistant (PDA), an enterprise digital assistant (EDA), a portable multimedia player (PMP), a wearable device, a black box, a robot, an autonomous vehicle, or the like.

In another embodiment, the image processing system 10 may be implemented as an electronic device separate from the host. For example, the image processing system 10 may be implemented as imaging device, a digital camera, a camcorder, a closed-circuit television (CCTV), a webcam, a security camera, an industrial vision camera, a mobile device, a smart phone, a PC, a tablet PC, a notebook, a PDA, an EDA, a PMP, a wearable device, a black box, a robot, an autonomous vehicle, an in-vehicle vision camera, a set-top box, a game console, an electronic dictionary, an e-book reader, a desktop computer, a server, an MP3 player, a smart medical device, a television, a digital video disk (DVD) player, an audio, a refrigerator, an air conditioner, a cleaner, an oven, a microwave oven, a washing machine, an air purifier, a smart mirror, a smart window, an electronic key, an electronic picture frame, a digital billboard, a security control panel, and the like. Here, the wearable device may be a smart watch, a ring, a bracelet, an anklet, a necklace, glasses, a contact lens, a head-mounted-device (HMD), a skin pad, a tattoo, a biological transplant type circuit, or the like.

The image sensor 100 may be implemented as a charge coupled device (CCD) image sensor and a complementary metal oxide semiconductor (CMOS) image sensor. The image sensor 100 may generate image data for an object (not shown) input (or captured) through a lens (not shown). The lens (not shown) may include at least one lens forming an optical system.

The image sensor 100 may include a plurality of pixels. The image sensor 100 may generate a plurality of pixel values DPXs corresponding to the captured image in a plurality of pixels. The plurality of pixel values DPXs generated by the image sensor 100 may be transmitted to the image processing device 200. That is, the image sensor 100 may generate the plurality of pixel values DPXs corresponding to a single frame.

The image processing device 200 may perform processing for improving image quality of pixel data received from the image sensor 100, and output the processed image data. Here, the processing may be electronic image stabilization (EIS), interpolation, color tone correction, image quality correction, size adjustment, or the like.

In FIG. 1, the image processing device 200 may be implemented as a chip independent of the image sensor 100. In this case, a chip of the image sensor 100 and the chip of the image processing device 200 may be implemented as one package, for example, a multi-chip package. In another embodiment of the present disclosure, the image processing device 200 may be included as a part of the image sensor 100 to be implemented as a single chip.

In an embodiment, the image processing system 10 may further include a memory. The memory may be implemented as a nonvolatile memory element. For example, the memory may be configured of various memory elements such as a read only memory (ROM) that may only read data, one time programmable (OTP) memory that may be written only once, an erasable and programmable ROM (EPROM) that may erase and write stored data, a NAND flash memory, and a NOR flash memory.

Figure 2:
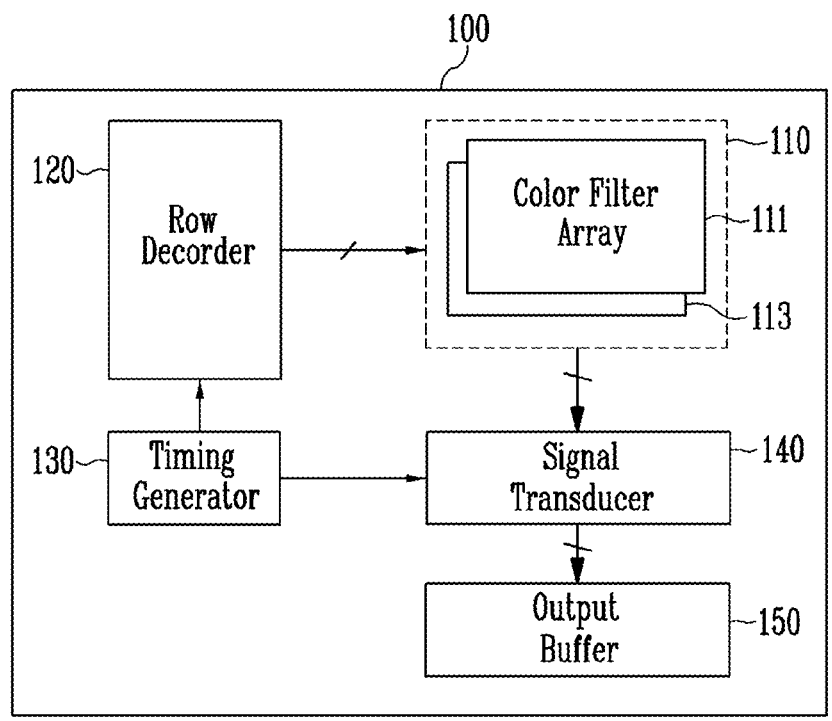
FIG. 2 is a diagram illustrating an image sensor of FIG. 1 according to an embodiment of the present disclosure.

FIG. 2 is a diagram illustrating the image sensor 100 of FIG. 1 according to an embodiment of the present disclosure.

Referring to FIG. 2, the image sensor 100 may include a pixel array 110, a row decoder 120, a timing generator 130, and a signal converter (or a signal transducer) 140.

The pixel array 110 may include a color filter array 111 according to an embodiment, and a photoelectric conversion layer 113 formed under the color filter array 111 and including a plurality of photoelectric conversion elements corresponding to each pixel of the color filter array 111. The pixel array 110 may include a plurality of pixels for outputting color information included in incident light. Each of the plurality of pixels may output a pixel signal corresponding to the incident light passing through the corresponding color filter array 111.

The color filter array 111 may include color filters that pass only a specific wavelength (for example, red, blue, or green) of light incident to each pixel. In the present disclosure, a color filter may be expressed as a color channel. Due to the color filter array 111, pixel data of each pixel may indicate a value corresponding to an intensity of the light of the specific wavelength.

Specifically, each of the plurality of pixels may accumulate photocharges generated according to the incident light, and generate a pixel signal corresponding to the accumulated photocharges. Each of the pixels may include a photoelectric conversion element (for example, a photo diode, a photo transistor, a photogate, or a pinned photo diode) that converts an optical signal into an electrical signal, and at least one transistor for processing the electrical signal.

The pixel array 110 may include the plurality of pixels arranged in a row direction and a column direction. The pixel array 110 may generate a plurality of pixel signals VPXs for each row. Each of the plurality of pixel signals VPXs may be an analog pixel signal VPX.

The row decoder 120 may select one row among a plurality of rows in which the plurality of pixels are arranged in the pixel array 110 in response to an address and control signals output from the timing generator 130.

The signal converter 140 may convert the plurality of analog pixel signals VPXs into a plurality of digital pixel values DPXs. The plurality of digital pixel values DPXs may be output in various patterns. The signal converter 140 may perform correlated double sampling (CDS) on each of signals output from the pixel array 110 in response to the control signals output from the timing generator 130 and perform an analog-to-digital conversion on each of the signals on which the CDS is performed to output each of digital signals. Each of the digital signals may be a signal corresponding to the intensity of the wavelengths of the incident light passing through the corresponding color filter array 111.

The signal converter 140 may include a CDS block and an analog-to-digital converter (ADC) block. The CDS block may sequentially sample and hold a reference signal and image signal set provided to each of a plurality of column lines included in the pixel array 110. That is, the CDS block may sample and maintain a level of a reference signal and an image signal corresponding to each of the columns. The ADC block may output the pixel data obtained by converting a CDS signal for each column output from the CDS block into a digital signal. To this end, the ADC block may include a comparator and a counter corresponding to each column.

In addition, the image sensor 100 according to an embodiment of the present disclosure may further include an output buffer 150. The output buffer 150 may be implemented as a plurality of buffers storing the digital signals output from the signal converter 140. Specifically, the output buffer 150 may latch and output the pixel data of each column provided from the signal converter 140. The output buffer 150 may temporarily store the pixel data output from the signal converter 140, and sequentially output the pixel data under the control of the timing generator 130. According to an embodiment of the present disclosure, the output buffer 150 may be omitted.

Figure 3:
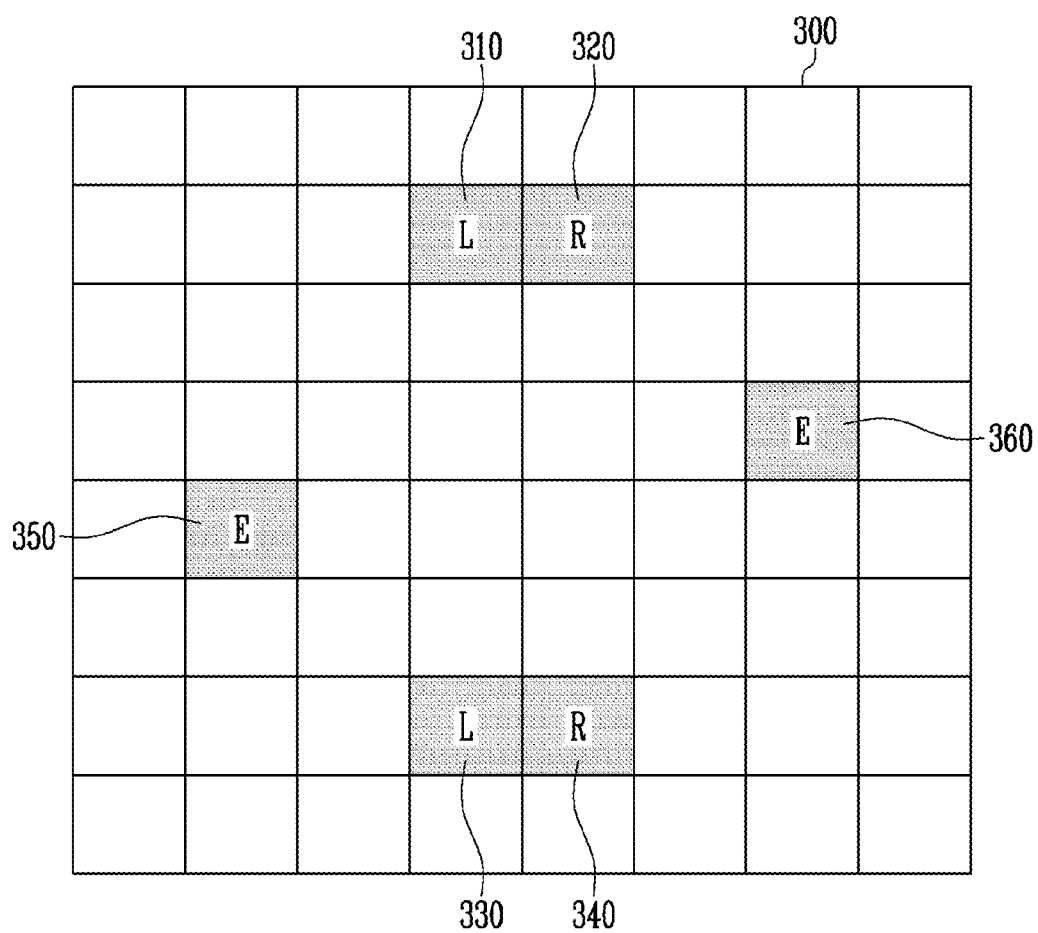
FIG. 3 is a diagram illustrating noise generated in an image according to an embodiment of the present disclosure.

FIG. 3 is a diagram illustrating noise generated in an image according to an embodiment of the present disclosure.

Referring to FIG. 3, the noise may be generated in an image 300 including a plurality of pixels. Among the plurality of pixels, a pixel that is different from pixel values of a neighboring pixel by a predetermined threshold value or more may be determined as a pixel in which the noise is generated. FIG. 3 may illustrate the image in which the noise is generated.

The image 300 including the plurality of pixels may include phase detection auto focus (PDAF) pixels 310, 320, 330, and 340 in which a linear characteristic is not maintained with the neighboring pixels. The PDAF pixels 310, 320, 330, and 340 may be photo diode (PD) pixels. A PD pixel might not maintain a linear characteristic with an adjacent pixel because a characteristic of a pixel changes according to a position. That is, pixel values of the PDAF pixels 310, 320, 330, and 340 may be determined as the noise.

The image 300 including the plurality of pixels may include a plurality of defective pixels 350 and 360. The plurality of defective pixels 350 and 360 may be generated due to various reasons. For example, each of a plurality of pixels included in the CMOS image sensor may accumulate photocharges generated according to incident light and generate a pixel signal corresponding to the accumulated photocharges. Interference light may be generated according to a distance between the plurality of pixels. When interference light and the incident light are incident on an CMOS image sensor, noise may be generated at an output of the CMOS image sensor.

A difference between the pixel value of the pixel in which the noise is generated and the pixel values of the neighboring pixels may be greater than or equal to a predetermined threshold value. The image processing device may determine the pixel of which the pixel value is different from the pixel values of the neighboring pixels by the predetermined threshold value or more as the pixel in which the noise is generated. For example, the image processing device may determine that the noise is generated in the PDAF pixels 310, 320, 330, and 340 and the defective pixels 350 and 360.

Fixed pattern noise may be caused by non-uniformity generated during CMOS image sensor production. The fixed pattern noise due to the non-uniformity may be noise of a form of a stripe in a vertical direction or a horizontal direction. The defective pixels or the PDAF pixels included in CMOS image sensors may cause the fixed pattern noise.

Figure 4:
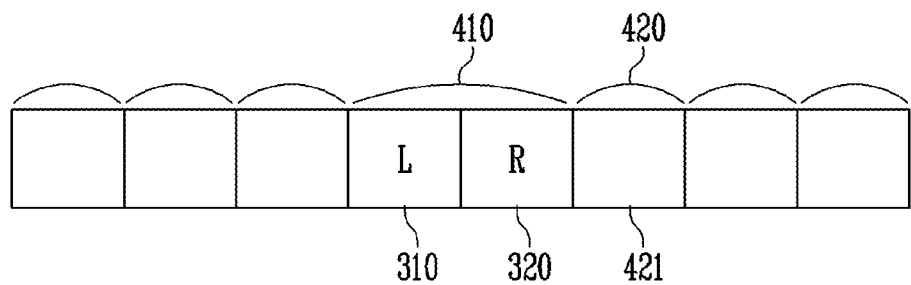
FIG. 4 is a diagram illustrating noise generated in phase detection auto focus pixels according to an embodiment of the present disclosure.

FIG. 4 is a diagram illustrating noise generated in PDAF pixels according to an embodiment of the present disclosure.

Referring to FIG. 4, an on-chip lens (OCL) that causes the light to be incident on the pixel may be positioned. A size of the OCL may be changed to correspond to a pixel positioned below the OCL.

One OCL 420 may correspond to one normal pixel 421. When the light is incident through one OCL 420, the pixel value may be output from one normal pixel 421.

The PDAF pixels 310 and 320 may correspond to one OCL 410. Since the light is incident on the PDAF pixels 310 and 320 through one OCL 410, the pixel values of the PDAF pixels 310 and 320 may be different from a pixel value of one normal pixel 421.

When the difference between the pixel values of the PDAF pixels 310 and 320 and the pixel value of one normal pixel 421 is greater than or equal to the predetermined threshold value, the image processing device may determine that the PDAF pixels 310 and 320 are the pixel in which the noise is generated. The noise may be generated in the PDAF pixels 310 and 320 due to a difference of the OCL.

Figure 5:
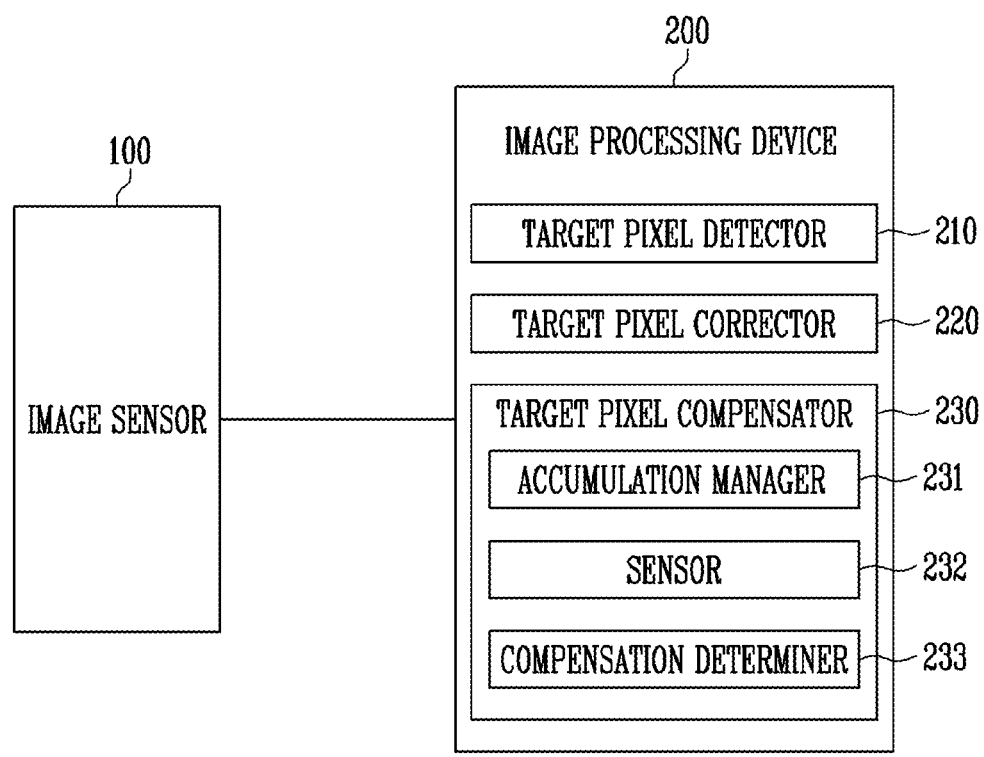
FIG. 5 is a block diagram illustrating an image processing system according to an embodiment of the present disclosure.

FIG. 5 is a block diagram illustrating an image processing system according to an embodiment of the present disclosure.

Referring to FIG. 5, the image processing device 200 may receive a plurality of pixel values from the image sensor 100 including the plurality of pixels. The image processing device 200 may remove the noise based on the plurality of received pixel values. The image processing device 200 may include a target pixel detector 210, a target pixel corrector 220, and a target pixel compensator 230. Each of the target pixel detector 210, the target pixel corrector 220, and the target pixel compensator 230 may be implemented as hardware, software, or a combination of hardware and software. For example, the target pixel detector 210 may be a target pixel detect circuit operating in accordance with an algorithm and/or a processor executing target pixel detect code. The target pixel corrector 220 may be a target pixel correct circuit operating in accordance with an algorithm and/or a processor executing target pixel correct code. The target pixel compensator 230 may be a target pixel compensate circuit operating in accordance with an algorithm and/or a processor executing target pixel compensate code.

The target pixel detector 210 may detect a plurality of target pixels in which the noise is generated among the plurality of pixels included in the image sensor 100. The target pixel detector 210 may detect a pixel corresponding to the pixel value that is different from the pixel values of the neighboring pixels by the predetermined threshold value or more as the target pixel. A difference between the pixel value of the defective pixel or the pixel value of the PDAF pixel and the pixel value of the neighboring pixel may be greater than the predetermined threshold value. The target pixel detector 210 may detect the defective pixel or the PDAF pixel as the target pixel.

The target pixel corrector 220 may change target pixel values, which are pixel values of the plurality of target pixels, by using average pixel values of the neighboring pixels included in a preset range based on a position of each of the plurality of target pixels. The target pixel corrector 220 may change the target pixel values into integer values which are values corresponding to an integer part of the average pixel values respectively corresponding to the plurality of target pixels. Since the target pixel corrector 220 uses only the integer values of the average pixel values when correcting the pixel values of the plurality of target pixels, decimal fraction values corresponding to a decimal fraction part of the average pixel values may not be used. Since the decimal fraction values are not used, a total average pixel values of an image after the plurality of target pixels are corrected may be less than a total average pixel values of the image before the plurality of target pixels are corrected.

When an arrangement of the target pixels is regular, the average pixel values of a row or a column including the target pixels may be reduced in the image. When the average pixel values of the row or the column is reduced, the fixed pattern noise having a regular arrangement may be generated. The fixed pattern noise generated in the image may be increased in correspondence with a density of the target pixel included in the image. When the PDAF pixel is included in the image, the arrangement of the target pixels may be regular.

The target pixel compensator 230 may compensate for the target pixel values by using an accumulation value obtained by accumulating the values corresponding to the decimal fraction part of the average pixel values. The target pixel compensator 230 may add a compensation value to the target pixel values. In an embodiment of the present disclosure, the compensation value may be 0 or 1.

The target pixel compensator 230 may further include an accumulation value manager 231, a sensor 232, and a compensation determiner 233. The accumulation value manager 231, also referred to as an accumulation manager, may generate the accumulation value obtained by accumulating the decimal fraction values, which are the values corresponding to the decimal fraction part of the average pixel values respectively corresponding to the plurality of target pixels. The sensor 232 may sense an occurrence of the decimal fraction value when the average pixel value and the integer value of the average pixel value are different from each other. The compensation determiner 233 may determine each compensation value to be added to the target pixel values based on the accumulation value.

The accumulation value manager 231 may generate the accumulation value obtained by accumulating the decimal fraction values of the average pixel value whenever the target pixel corrector 220 changes the pixel value of the target pixel. The accumulation value manager 231 may accumulate the decimal fraction value of the average pixel value that is not used to change the pixel value of the target pixel. As the number of target pixels of which the pixel value is changed increases, the accumulation value may increase.

The compensation determiner 233 may compare the accumulation value with a predetermined reference value in response to an occurrence of the decimal fraction value. The compensation determiner 233 may determine the compensation value as 1 when the accumulation value is greater than or equal to the predetermined reference value. The accumulation value manager 231 may subtract the reference value from the accumulation value in response to the compensation value determined as 1. The target pixel compensator 230 may add the compensation value determined as 1 to the pixel value of the target pixel changed to the integer value. That is, the pixel value of the target pixel may be increased by 1. The compensation determiner 233 may determine the compensation value as 0 when the accumulation value is less than the reference value. The pixel value of the target pixel of which the compensation value is 0 may be maintained.

In another embodiment of the present disclosure, the compensation determiner 233 may determine the compensation value corresponding to the pixel value of the target pixel of which a position is determined in advance among the plurality of target pixels detected by the target pixel detector 210 as 1. For example, the PDAF pixel may be the target pixel of which the position is predetermined in advance.

In another embodiment of the present disclosure, the compensation determiner 233 may determine the compensation value corresponding to the pixel value of the target pixel of which the position is random among the target pixels detected by the target pixel detector 210 as 1. For example, the defective pixel may be the target pixel of which the position is random.

The accumulation value manager 231 may subtract the reference value from the accumulation value in response to the compensation value determined as 1. When the compensation value is determined as 1, the accumulation value may be decreased. In an embodiment of the present disclosure, the accumulation value may be maintained within a certain range.

In an embodiment of the present disclosure, the predetermined reference value may be 1. When a pixel value of a first target pixel is corrected, a decimal fraction value of the average pixel value may be generated. At this time, the accumulation value may be a decimal fraction value corresponding to the first target pixel. Since the accumulation value is less than the predetermined reference value of 1, the compensation value corresponding to the first target pixel may be determined as 0. Since the compensation value corresponding to the first target pixel is 0, the pixel value of the first target pixel changed to an integer value may be maintained. When the pixel values of the plurality of target pixels are corrected, the accumulation value may be increased. When the accumulation value is greater than or equal to 1, the pixel value of the target pixel changed to the integer value may be increased by 1. When the compensation value is determined as 1, the accumulation value manager 231 may subtract 1 from the accumulation value.

In another embodiment of the present disclosure, the compensation determiner 233 may randomly determine the compensation value as 0 or 1 in response to the occurrence of the decimal fraction value. The sensor 232 may sense the occurrence of the decimal fraction value when the average pixel value and the integer value of the average pixel value are different from each other. For example, when the pixel value of the first target pixel is corrected, the decimal fraction value of the average pixel value may be generated. At this time, the accumulation value may be a decimal fraction value corresponding to the first target pixel. The compensation determiner 233 may determine the compensation value as 1 in response to the occurrence of the decimal fraction value.

The compensation determiner 233 may determine the compensation value as 0 or 1 according to a ratio determined based on the accumulation value. The number of compensation values determined as 1 may vary according to the accumulation value. For example, the number of target pixels may be 10. The number of compensation values to be determined as 1 may be three in response to the accumulation value among the 10 target pixels. Among the target pixels, the target pixels of which the compensation value is determined as 1 may be randomly selected, but the number may be the same as three.

In still another embodiment of the present disclosure, the image processing device 200 may remove the noise generated in the image obtained by the image sensor 100. The image processing device 200 may include the target pixel detector 210, the target pixel corrector 220, and the target pixel compensator 230.

The target pixel corrector 220 may change the target pixel values, which are the pixel values of the plurality of target pixels, by using average pixel values of contact pixels that are in contact with each other in a horizontal direction based on the position of each of the plurality of target pixels. The contact pixels may be two pixels in contact with each other in a horizontal direction or a vertical direction based on the positions of each of the plurality of target pixels. The target pixel corrector 220 may change the target pixel values into the integer values which are the values corresponding to the integer part of the average pixel values respectively corresponding to the plurality of target pixels.

The target pixel compensator 230 may compensate for the target pixel values based on sum values of the pixel values of the contact pixels. The sum value may be a value obtained by summing pixel values of two pixels adjacent to the target pixel in the horizontal direction, or may be a value obtained by adding pixel values of two pixels adjacent to the target pixel in the vertical direction.

The target pixel compensator 230 may further include the accumulation value manager 231, the sensor 232, and the compensation determiner 233. The accumulation value manager 231 may generate the accumulation value increased by 1 in response to sum values which are odd numbers among the sum values. The sensor 232 may sense an increase of the accumulation value. The compensation determiner 233 may determine at least one compensation pixel to which a predetermined compensation value is added among the plurality of target pixels based on the accumulation value.

The compensation determiner 233 may determine a target pixel corresponding to a sum value increasing the accumulation value from an odd number to an even number as the compensation pixel. The accumulation value may be increased only when the sum value is the odd number. The compensation determiner 233 may determine the target pixel increasing the accumulation value to the even number as the compensation pixel among the plurality of target pixels. The target pixel compensator 230 may add 1, which is a predetermined compensation value, to the pixel value of the compensation pixel. In an embodiment of the present disclosure, the accumulation value may be the even number or the odd number while increasing in response to the sum value. The compensation pixel may be determined according to the accumulation value among the plurality of target pixels. The pixel value of the compensation pixel may be increased by 1.

In another embodiment of the present disclosure, the compensation determiner 233 may randomly determine the compensation pixel according to a ratio determined based on the accumulation value. A predetermined compensation value of 1 may be added to the pixel value of the compensation pixel. The compensation pixel may be randomly determined among the plurality of target pixels, but the ratio determined as the compensation pixel among the plurality of target pixels may be constant.

Figure 6:
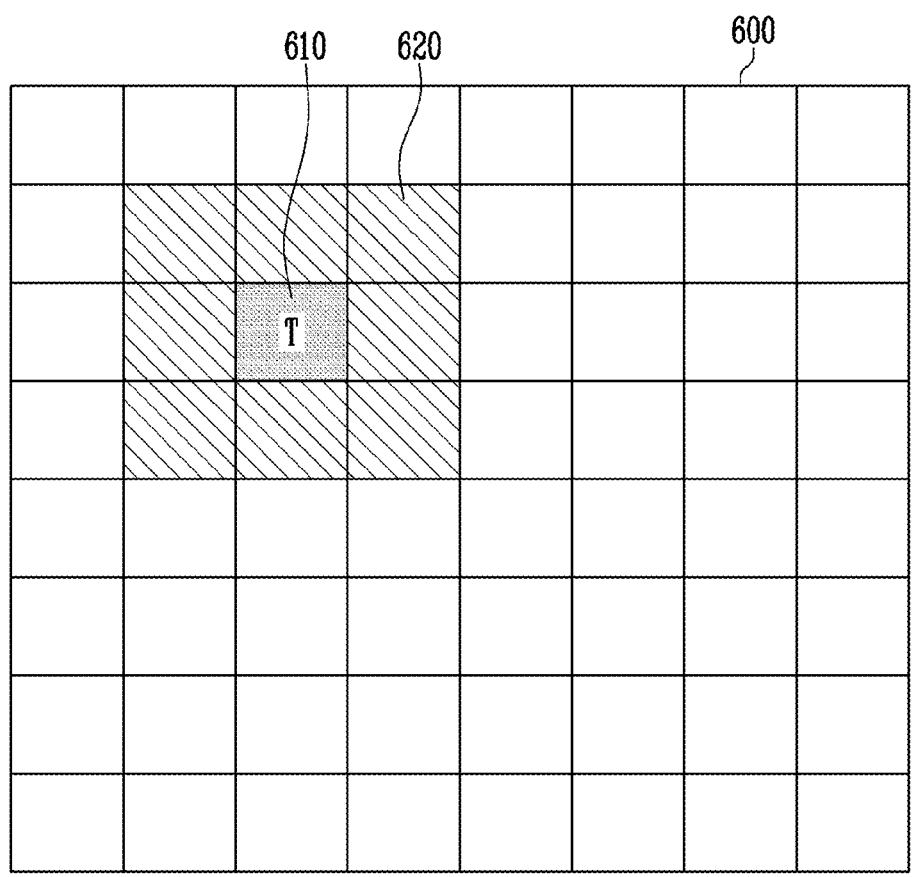
FIG. 6 is a diagram illustrating a target pixel and neighboring pixels according to an embodiment of the present disclosure.

FIG. 6 is a diagram illustrating a target pixel and neighboring pixels according to an embodiment of the present disclosure.

Referring to FIG. 6, a portion 600 of an image may include a target pixel 610 and neighboring pixels 620 positioned around the target pixel 610. A range of the neighboring pixels 620 may vary. A method of correcting a pixel value of the target pixel 610 of FIG. 6 may correspond to the description of FIG. 5.

It may be assumed, for example, that pixel values of the neighboring pixels 620 are 10, 11, 11, 12, 13, 10, 10, and 15. The target pixel corrector 220 may calculate an average pixel value of the neighboring pixels 620. Specifically, the average pixel value may be 11.5. The target pixel corrector 220 may change the pixel value of the target pixel 610 to 11 from a previous value. An integer value 11 of the average pixel value may become the pixel value of the target pixel, and a decimal fraction value 0.5 of the average pixel value may be accumulated by the accumulation value manager 231.

It may be assumed that a value of 0.25 accumulated in the accumulation value manager 231 exists. The accumulation value manager 231 may generate 0.75 as the accumulation value by adding 0.25 and a decimal fraction value of 0.5 of the average pixel value. The sensor 232 may sense an occurrence of the decimal fraction value of 0.5 of the average pixel value.

When the sensor 232 senses the occurrence of the decimal fraction value of 0.5, the compensation determiner 233 may compare the accumulation value of 0.75 with a predetermined reference value of 1. Since the accumulation value of 0.75 is less than the reference value of 1, the compensation determiner 233 may determine the compensation value as 0. Since the compensation value is 0, the pixel value of the target pixel may be maintained as 11.

It may be assumed that an accumulation value of 0.75 exists in the accumulation value manager 231. The accumulation value manager 231 may generate 1.25 as the accumulation value by adding 0.75 to a decimal fraction value of 0.5 of the average pixel value. The sensor 232 may sense an occurrence of the decimal fraction value of 0.5 of the average pixel value. When the sensor 232 sense the occurrence of the decimal fraction value of 0.5, the compensation determiner 233 may compare the accumulation value of 1.25 with the predetermined reference value of 1. Since the accumulation value of 1.25 is greater than the reference value of 1, the compensation determiner 233 may determine the compensation value as 1.

The target pixel compensator 230 may add the compensation value of 1 to the pixel value of 11 of the target pixel. The pixel value of the target pixel to which the compensation value is added may become 12. When the compensation determiner 233 determines the compensation value as 1, the accumulation value manager 231 may subtract 1 from the accumulation value of 1.25. The value accumulated in the accumulation value manager 231 may be 0.25.

In another embodiment of the present invention, it may be assumed that a value of 0.75 accumulated in the accumulation value manager 231 exists and the decimal fraction value of the target pixel 610 is 0.5. The accumulation value manager 231 may generate 1.25 as the accumulation value by adding 0.75 to the decimal fraction value of 0.5 of the average pixel value. The compensation determiner 233 may determine the target pixel 610 as the compensation pixel. The target pixel compensator 230 may add the compensation value to the pixel value of the compensation pixel.

Figure 7:
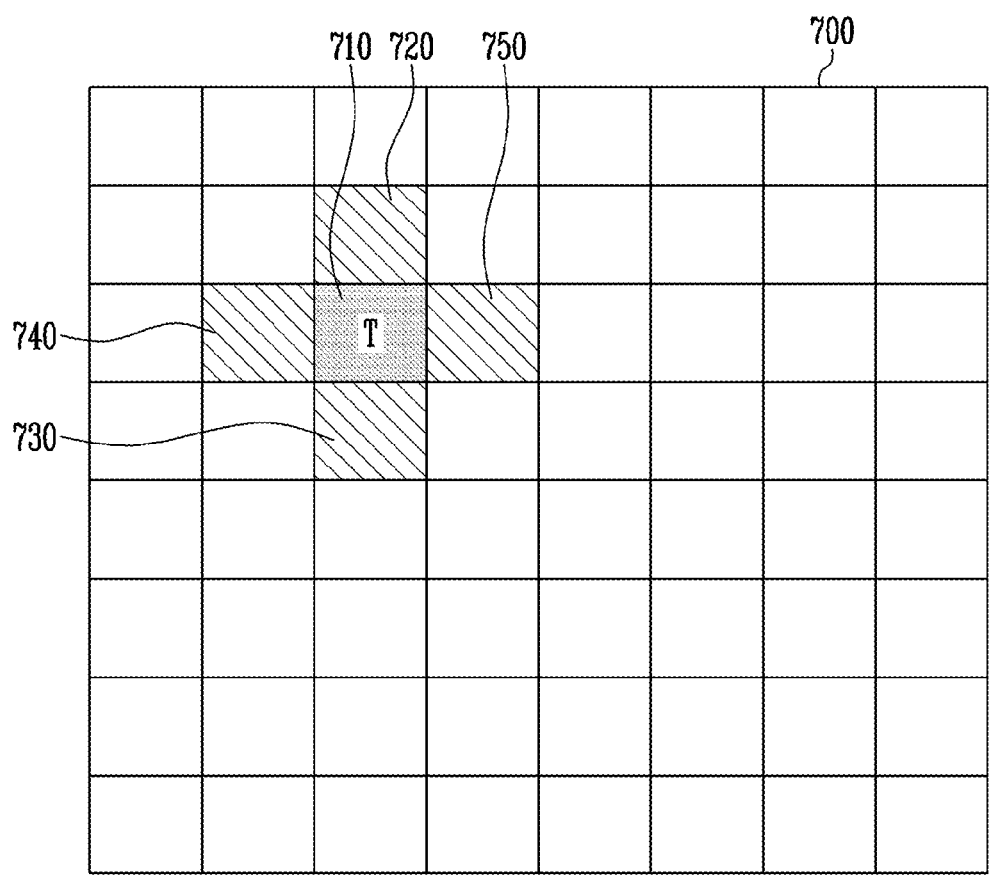
FIG. 7 is a diagram illustrating a target pixel and pixels adjacent to the target pixel according to an embodiment of the present disclosure.

FIG. 7 is a diagram illustrating a target pixel and pixels adjacent to the target pixel according to an embodiment of the present disclosure.

Referring to FIG. 7, a portion 700 of an image may include a target pixel 710, pixels 720 and 730 adjacent to the target pixel 710 in the vertical direction, and pixels 740 and 750 adjacent to the target pixel 710 in the horizontal direction. Pixel values of the pixels 720 and 730 adjacent in the vertical direction to the target pixel 710 may be 11 and 15, respectively, and pixel values of the pixels 740 and 750 adjacent in the horizontal direction to the target pixel 710 may be 13 and 14.

The target pixel corrector 220 may correct the pixel value of the target pixel 710 based on the pixel values of the pixels 720 and 730 adjacent in the vertical direction to the target pixel 710. A sum value obtained by adding the pixel values of the pixels 720 and 730 adjacent in the vertical direction to the target pixel 710 may be 26. The target pixel corrector 220 may change the pixel value of the target pixel 710 to 13, which is an average pixel value of the sum value of 26. Since the sum value 26 is an even number, the pixel value of the target pixel 710 might not be corrected.

The target pixel corrector 220 may correct the pixel value of the target pixel 710 based on the pixel values of the pixels 740 and 750 adjacent in the horizontal direction to the target pixel 710. A sum value obtained by adding the pixel values of the pixels 740 and 750 adjacent in the horizontal direction of the target pixel 710 may be 27. At this time, an average pixel value of the sum value may be 13.5. The target pixel corrector 220 may change the pixel value of the target pixel 710 to 13, which is an integer value of the average pixel value. Since the sum value of 27 is an odd number, the accumulation value manager 231 may generate an accumulation value obtained by adding 1 to an already accumulated value. When the already accumulated value is 1, the accumulation value may become 2.

Since the sum value of 27 is an odd number, the sensor 232 may sense an increase of the accumulation value. Since the accumulation value 2 is an even number rather than 0, the compensation determiner 233 may determine the compensation value as 1. The target pixel compensator 230 may add a compensation value of 1 to the pixel value 13 of the target pixel 710. The pixel value of the target pixel 710 to which the compensation value is added may be 14. In an embodiment of the present disclosure, the pixel value of the target pixel 710 may be changed in response to pixels used for pixel value correction.

In another embodiment of the present disclosure, it may be assumed that the value accumulated in the accumulation value manager 231 is an odd number and the sum value of the target pixel 710 is 27. The sum value of 27 may increase the accumulation value from an odd number to an even number. The compensation determiner 233 may determine the target pixel 710 as the compensation pixel. The target pixel compensator 230 may add the compensation value to the pixel value of the compensation pixel.

Figure 8:
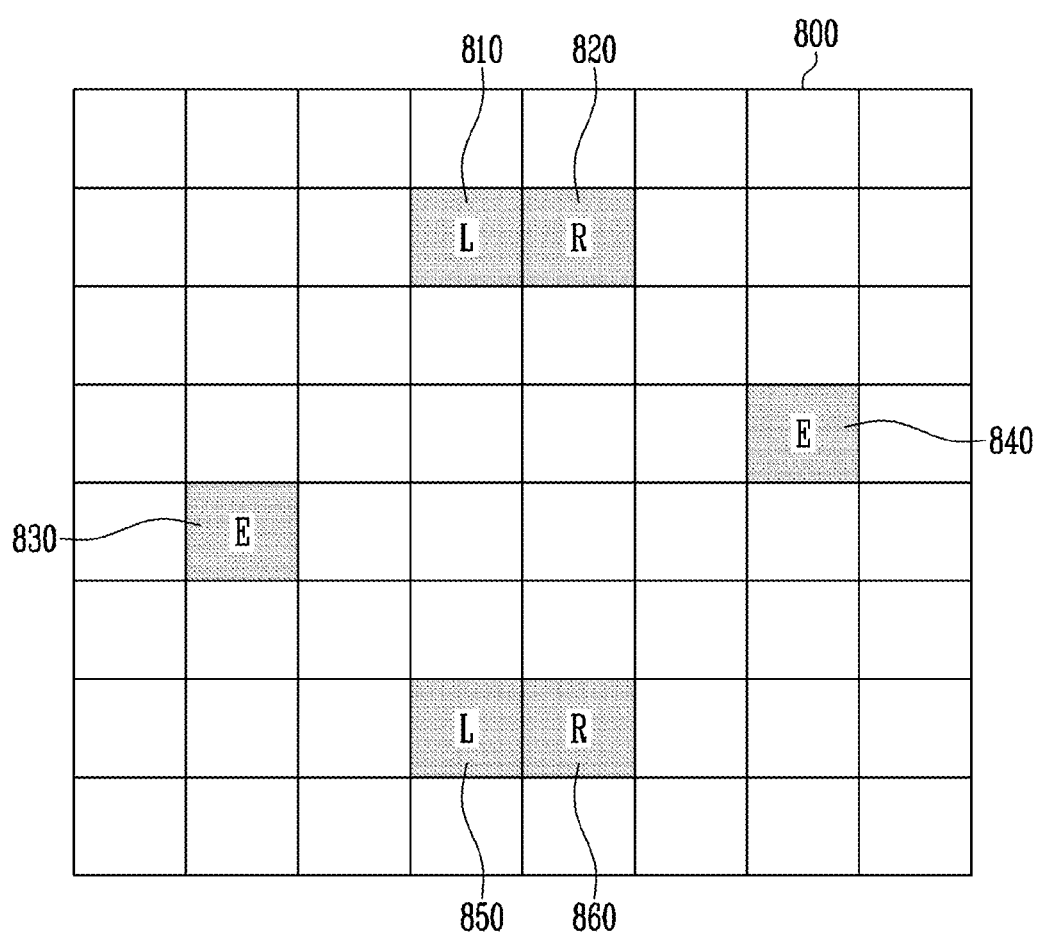
FIG. 8 is a diagram illustrating a randomly determined compensation value according to an embodiment of the present disclosure.

FIG. 8 is a diagram illustrating a randomly determined compensation value according to an embodiment of the present disclosure.

Referring to FIG. 8, a portion 800 of an image may include six target pixels 810, 820, 830, 840, 850, and 860. Among the six target pixels 810, 820, 830, 840, 850, and 860, 810, 820, 850, and 860 may correspond to the PDAF pixels. Among the six target pixels 810, 820, 830, 840, 850, and 860, 830 and 840 may correspond to the defective pixels. The method of determining the compensation value in FIG. 8 may correspond to the description of FIG. 5.

When the average pixel value of the pixel value of the neighboring pixels is an integer value, the compensation value might not be added to the target pixel. When a decimal fraction value is included in the average pixel value of the pixel value of the neighboring pixels, the target pixel compensator 230 may add the compensation value to the target pixel. When the sensor 232 senses the occurrence of the decimal fraction value, the compensation determiner 233 may randomly determine the compensation value to be added to the target pixel as 0 or 1.

Specifically, a decimal fraction value may be include in an average pixel value corresponding to 810, 820, 830, and 840 among the six target pixels 810, 820, 830, 840, 850, and 860. An average pixel value corresponding to 850 and 860 among the six target pixels 810, 820, 830, 840, 850 and 860 may be an integer value. The compensation value might not be added to the target pixels 850 and 860.

The compensation determiner 233 may determine a compensation value corresponding to the target pixels 810, 820, 830, and 840. The compensation value may be 0 or 1. The compensation value may be randomly determined, but the number of compensation values determined as 1 may be determined in advance. For example, the number of compensation values determined as 1 may be one. When the compensation value corresponding to the target pixel 820 among the target pixels 810, 820, 830, and 840 is determined as 1, compensation values corresponding to the remaining target pixels 810, 830, and 840 may be determined as 0. Similarly, when all of the compensation values corresponding to the target pixels 810, 820, and 830 are 0, the compensation value corresponding to the target pixel 840 is determined as 1.

The compensation determiner 233 may determine the compensation value as 0 or 1 according to a ratio determined based on the accumulation value. The number of compensation values determined as 1 in response to the accumulation value generated by the accumulation value manager 231 may be different. For example, when the accumulation value is 3, the number of compensation values determined as 1 may be three.

In another embodiment of the present disclosure, the compensation determiner 233 may determine compensation pixels to which compensation values are added among the target pixels 810, 820, 830, and 840. The compensation pixels may be randomly determined, but the number of compensation pixels may be determined in advance. The target pixel compensator 230 may add the compensation value to the pixel values of the compensation pixels.

In still another embodiment of the present disclosure, the compensation determiner 233 may determine the compensation value corresponding to the pixel value of the target pixel of which the position is determined in advance among the target pixels detected by the target pixel detector 210 as 1. The PDAF pixel may be the target pixel of which the position is determined in advance. The compensation determiner 233 may determine the compensation value of the target pixels 810, 820, 850, and 860 of which the position is determined in advance as 1.

In still another embodiment of the present disclosure, the compensation determiner 233 may determine the compensation value corresponding to the pixel value of the target pixel of which the position is random among the target pixels detected by the target pixel detector 210 as 1. The defective pixel may be the target pixel of which the position is random. The compensation determiner 233 may determine the compensation value of the target pixels 830 and 840 of which the position is random as 1.

Figure 9:
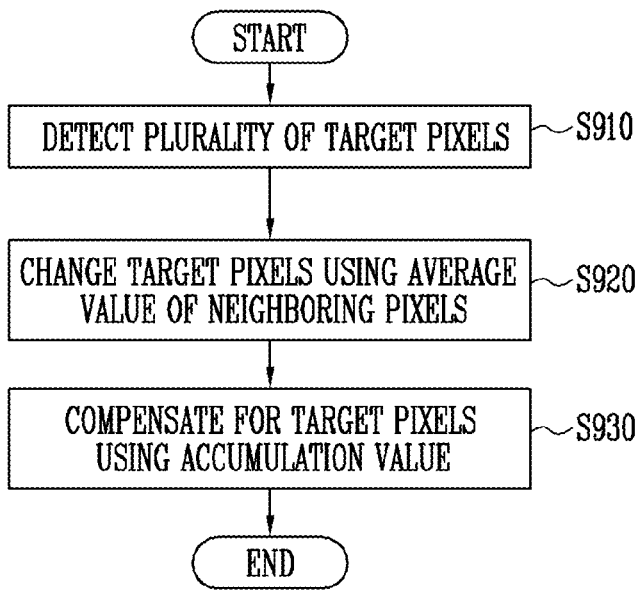
FIG. 9 is a flowchart illustrating a method of compensating for a pixel value of a target pixel changed based on an accumulation value according to an embodiment of the present disclosure.

FIG. 9 is a flowchart illustrating a method of compensating for a pixel value of a target pixel changed based on an accumulation value according to an embodiment of the present disclosure.

Referring to FIG. 9, the image processing device 200 may remove the noise generated in the image.

In step S910, the target pixel detector 210 may detect the plurality of target pixels in which the noise is generated among the plurality of pixels included in the image sensor. The target pixel detector 210 may detect the pixel corresponding to the pixel value different from the pixel value of the neighboring pixels by the predetermined threshold value or more as the target pixel. The difference between the pixel value of the defective pixel or the pixel value of the PDAF pixel and the pixel value of the neighboring pixel may be greater than the predetermined threshold value. The target pixel detector 210 may detect the defective pixel or the PDAF pixel as the target pixel.

In step S920, the target pixel corrector 220 may change the target pixel values, which are the pixel values of the plurality of target pixels, by using the average pixel values of the neighboring pixels included in the preset range based on the position of each of the plurality of target pixels. The target pixel corrector 220 may change the target pixel values into the integer values which are the values corresponding to the integer part of the average pixel values respectively corresponding to the plurality of target pixels. Since the target pixel corrector 220 uses only the integer values of the average pixel values when correcting the pixel values of the plurality of target pixels, the decimal fraction values corresponding to the decimal fraction part of the average pixel values might not be used. Since the decimal fraction values are not used, the total average pixel values of the image after the plurality of target pixels are corrected may be less than the total average pixel values of the image before the plurality of target pixels are corrected.

In step S930, the target pixel compensator 230 may compensate for the target pixel values using the accumulation value obtained by accumulating the values corresponding to the decimal fraction part of the average pixel values. The target pixel compensator 230 may add the compensation value determined based on the accumulation value to each of the target pixel values. In another embodiment of the present disclosure, the target pixel compensator 230 may determine at least one compensation pixel to which a predetermined compensation value is added among the plurality of target pixels.

Figure 10:
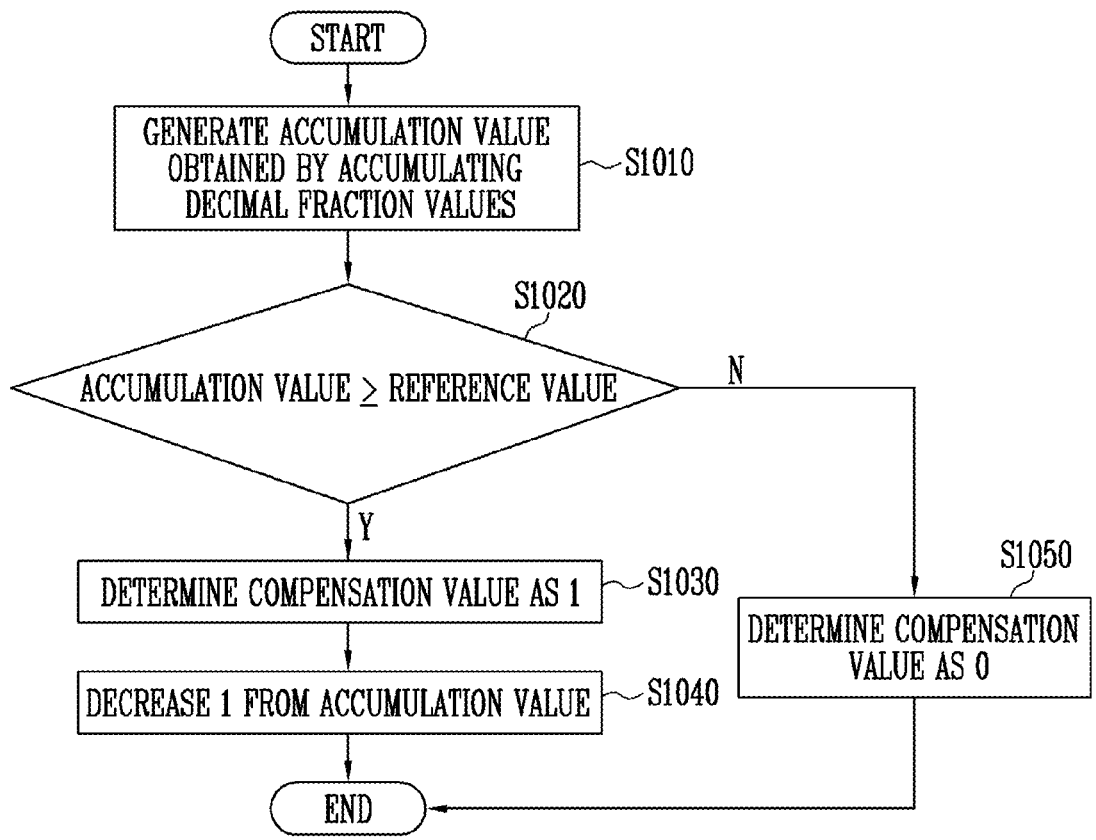
FIG. 10 is a flowchart illustrating a method of determining a compensation value according to an embodiment of the present disclosure.

FIG. 10 is a flowchart illustrating a method of determining a compensation value according to an embodiment of the present disclosure.

Referring to FIG. 10, the compensation determiner 233 may determine the compensation value corresponding to the target pixel as 0 or 1 based on the accumulation value.

In step S1010, the accumulation value manager 231 may generate the accumulation value obtained by accumulating the decimal fraction values, which are the values corresponding to the decimal fraction part of the average pixel values respectively corresponding to the plurality of target pixels. The accumulation value manager 231 may accumulate the decimal fraction value of the average pixel value that is not used in changing the pixel value of the target pixel. As the number of target pixels of which the pixel value is changed increases, the accumulation value may increase.

In step S1020, the compensation determiner 233 may compare the accumulation value with the predetermined reference value in response to the occurrence of the decimal fraction value. In an embodiment of the present disclosure, the predetermined reference value may be 1.

In step S1030, the compensation determiner 233 may determine the compensation value as 1 when the accumulation value is greater than or equal to the predetermined reference value. The target pixel compensator 230 may add the compensation value determined as 1 to the pixel value of the target pixel changed to the integer value. That is, the pixel value of the target pixel may be increased by 1.

In step S1040, the accumulation value manager 231 may subtract the reference value from the accumulation value in response to the compensation value determined as 1. When the compensation value is determined as 1, the accumulation value may be decreased. In an embodiment of the present disclosure, the accumulation value may be maintained within a certain range.

In step S1050, the compensation determiner 233 may determine the compensation value as 0 when the accumulation value is less than the reference value. The pixel value of the target pixel of which the compensation value is 0 may be maintained.

For example, when the pixel value of the first target pixel is corrected, the decimal fraction value of the average pixel value may be generated. At this time, the accumulation value may be the decimal fraction value corresponding to the first target pixel. Since the accumulation value is less than the predetermined reference value of 1, the compensation value may be 0, and the pixel value of the first target pixel changed to the integer value may be maintained. When the pixel values of the plurality of target pixels are corrected, the accumulation value may be increased. When the accumulation value is greater than or equal to 1, the pixel value of the target pixel to be changed to the integer value may be increased by 1.

The method of determining the compensation value of FIG. 10 may correspond to the description of FIG. 6.

FIG. 11 is a flowchart illustrating a method of compensating for a pixel value of a target pixel changed based on an accumulation value according to another embodiment of the present disclosure.

Referring to FIG. 11, the compensation determiner 233 may determine at least one compensation pixel to which the compensation value is added among the plurality of target pixels based on the accumulation value.

In step S1110, the target pixel detector 210 may detect the plurality of target pixels in which the noise is generated among the plurality of pixels included in the image sensor 100. The target pixel detector 210 may detect the pixel corresponding to the pixel value different from the pixel value of the neighboring pixels by the predetermined threshold value or more as the target pixel.

In step S1120, the target pixel values, which are the pixel values of the plurality of target pixels, may be changed using the average pixel values of the contact pixels in contact with each other in the horizontal direction based on the position of each of the plurality of target pixels. The contact pixels may be two pixels in contact with each other in the horizontal direction or the vertical direction based on the position of each of the plurality of target pixels. The target pixel corrector 220 may change the target pixel values into the integer values which are the values corresponding to the integer part of the average pixel values respectively corresponding to the plurality of target pixels.

In step S1130, the accumulation value manager 231 may generate the accumulation value by using the sum values of the contact pixels. The accumulation value manager 231 may generate the accumulation value increases by 1 in response to the sum values which are the odd numbers among the sum values.

In step S1140, the compensation determiner 233 may determine at least one compensation pixel to which the predetermined compensation value is added among the plurality of target pixels based on the accumulation value. The compensation determiner 233 may determine the target pixel corresponding to the sum increasing the accumulation value from the odd number to the even number as the compensation pixel. The accumulation value may be increased only when the sum value is the odd number.

In step S1150, the target pixel compensator 230 may add 1, which is the predetermined compensation value, to the pixel value of the compensation pixel. In an embodiment of the present disclosure, the accumulation value may be the even number or the odd number while increasing corresponding to the sum value. The compensation pixel may be determined according to the accumulation value among the plurality of target pixels. The pixel value of the compensation pixel may be increased by 1.

The method of determining the compensation value of FIG. 11 may correspond to the description of FIG. 7.

FIG. 12 is a flowchart illustrating a method of compensating for a pixel value of a target pixel according to still another embodiment of the present disclosure.

Referring to FIG. 12, a first target pixel value or a second target pixel value may be compensated.

In step S1210, the target pixel corrector 220 may change the pixel value of the first target pixel by using the average pixel value of the neighboring pixels included in a predetermined range of the first target pixel in which the noise is generated among the plurality of pixels. The target pixel corrector 220 may calculate the average pixel value of the neighboring pixels included in the predetermined range of the first target pixel and change the pixel value of the first target pixel to the integer value of the average pixel value.

In step S1220, the target pixel corrector 220 may change a pixel value of a second target pixel by using an average pixel value of neighboring pixels included in a predetermined range of the second target pixel in which the noise is generated among the plurality of pixels. The target pixel corrector 220 may calculate the average pixel value of the neighboring pixels included in the predetermined range of the second target pixel and change the pixel value of the second target pixel to an integer value of the average pixel value.

In step S1230, the accumulation value manager 231 may generate an accumulation value obtained by accumulating a first decimal fraction value which is a value corresponding to a decimal fraction part of the average pixel value corresponding to the first target pixel and a second decimal fraction value which is a value corresponding to a decimal fraction part of the average pixel value corresponding to the second target pixel.

In step S1240, the target pixel compensator 230 may compensate the pixel value of the first target pixel or the pixel value of the second target pixel based on the accumulation value. The compensation determiner 233 may select one of the first target pixel and the second target pixel. When the accumulation value is greater than or equal to the predetermined reference value, the compensation determiner 233 may add 1 to the pixel value of any one selected target pixel. The accumulation value manager 231 may subtract 1 from the accumulation value. In an embodiment of the present disclosure, when the accumulation value is less than the reference value, the compensation determiner 233 may add 0 to the pixel value of any one selected target pixel.

The target pixel compensator 230 may compensate for a pixel value of a third target pixel in which the noise is generated among the plurality of pixels when the accumulation value is less than the reference value. Specifically, the target pixel corrector 220 may change the pixel value of the third target pixel by using an average pixel value of neighboring pixels included in a predetermined range of the third target pixel. The accumulation value manager 231 may generate an additional accumulation value obtained by accumulating a third decimal fraction value, which is a value corresponding to a decimal fraction part of the average pixel value corresponding to the third target pixel, and the accumulation value. The target pixel compensator 230 may add the compensation value determined based on the accumulation value to the pixel value of the third target pixel.

FIG. 13 is a block diagram illustrating a computing system 2000 including an image sensor 2010 according to an embodiment of the present disclosure.

Referring to FIG. 13, the computing system 2000 includes the image sensor 2010, a processor 2020, a storage device 2030, a memory device 2040, an input/output device 2050, and a display device 2060. Although not shown in FIG. 13, the computing system 2000 may further include ports capable of communicating with a video card, a sound card, a memory card, a USB device, or the like, or communicating with other electronic devices.

The image sensor 2010 may generate image data corresponding to incident light. The display device 2060 may display the image data. The storage device 2030 may store the image data. The processor 2020 may control operations of the image sensor 2010, the display device 2060, and the storage device 2030.

The processor 2020 may perform certain calculations or tasks. According to an embodiment of the present disclosure, the processor 2020 may be a microprocessor or a central processing unit (CPU). The processor 2020 may be connected to the storage device 2030, the memory device 2040, and the input/output device 2050 through an address bus, a control bus, and a data bus to perform communication. According to an embodiment of the present disclosure, the processor 2020 may also be connected to an expansion bus such as a peripheral component interconnect (PCI) bus.

The storage device 2030 may include a flash memory device, a solid state drive (SSD), a hard disk drive (HDD), a CD-ROM, all types of nonvolatile memory devices, and the like.

The memory device 2040 may store data necessary for an operation of the computing system 2000. For example, the memory device 2040 may include a volatile memory device such as a dynamic random access memory (DRAM) and a static random access memory (SRAM), and a nonvolatile memory device such as an erasable programmable read-only memory (EPROM), an electrically erasable programmable read-only memory (EEPROM), and a flash memory device.

The input/output device 2050 may include an input means such as a keyboard, a keypad, and a mouse, and an output means such as a printer and a display.

The image sensor 2010 may be connected to the processor 2020 through the buses or another communication links to perform communication.

The image sensor 2010 may perform binning on a plurality of pixel data generated from the plurality of pixels included in the pixel array to generate binning pixel data uniformly distributed in the pixel array.

The image sensor 2010 may be implemented in various types of packages. For example, at least some configurations of the image sensor 2010 may be implemented using packages such as a package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), system in package (SIP), multi-chip package (MCP), wafer-level fabricated package (WFP), wafer-level processed stack package (WSP), and the like.

According to an embodiment, the image sensor 2010 may be integrated together with the processor 2020 in one chip, or the image sensor 2010 and the processor 2020 may be integrated in different chips, respectively.

Meanwhile, the computing system 2000 should be interpreted as all computing systems using the image sensor 2010. For example, the computing system 2000 may include a digital camera, a mobile phone, a PDA, a PMP, a smart phone, and the like.

Since the present disclosure may be implemented in other specific forms without changing the technical spirit or essential features thereof, those of ordinary skill in the art to which the present disclosure pertains should understand that the embodiments described above are illustrative and are not limited in all aspects. The scope of the present disclosure is indicated by the appended claims rather than the detailed description, and all changes or modifications derived from the meaning and scope of the claims and their equivalent concepts are interpreted as being included in the scope of the present disclosure.

What is claimed is:

1. An image processing device comprising:
a target pixel detector configured to detect a plurality of target pixels in which noise is generated among a plurality of pixels included in an image sensor;
a target pixel corrector configured to change target pixel values of the plurality of target pixels, by using average pixel values of neighboring pixels of each of the plurality of target pixels; and
a target pixel compensator comprising a compensation determiner configured to determine compensation pixels to which a compensation value is added to a pixel value among the plurality of target pixels based on the accumulation value,
wherein the target pixel compensator is configured to compensate for the target pixel values by using an accumulation value obtained by accumulating values corresponding to a decimal fraction part of the average pixel values.

2. The image processing device of claim 1,
wherein the target pixel corrector is configured to determine a range of the neighboring pixels according to preset value.

3. The image processing device of claim 2,
wherein the target pixel corrector is configured to convert the target pixel values into integer part of the average pixel values.

4. The image processing device of claim 2, wherein the target pixel compensator further comprises:
an accumulation value manager configured to generate the accumulation value by accumulating decimal fraction values which are the values corresponding to the decimal fraction part of the average pixel values,
wherein the compensation determiner respectively determines the compensation value based on the accumulation value.

5. The image processing device of claim 4,
wherein the target pixel compensator further comprises a sensor configured to sense an occurrence of the decimal fraction value.

6. The image processing device of claim 4,
wherein the compensation determiner is configured to compare the accumulation value with a predetermined reference value in response to an occurrence of the decimal fraction value, and determine the compensation value as one (1) when the accumulation value is greater than or equal to the reference value, and
the accumulation value manager is configured to subtract the reference value from the accumulation value in response to the compensation value determined as one (1).

7. The image processing device of claim 6,
wherein the compensation determiner is configured to determine the compensation value as zero (0) when the accumulation value is less than the reference value.

8. The image processing device of claim 5,
wherein the compensation determiner is configured to randomly determine the compensation value as zero (0) or one (1) in response to the occurrence of the decimal fraction value.

9. The image processing device of claim 8,
wherein the compensation determiner is configured to determine the compensation value as zero (0) or (1) according to a ratio determined based on the accumulation value.

10. The image processing device of claim 2,
wherein the target pixel compensator is configured to add one (1) to pixel values of target pixels for which positions are determined in advance among the plurality of target pixels.

11. The image processing device of claim 2,
wherein the target pixel compensator is configured to add one (1) to pixel values of target pixels having random positions among the plurality of target pixels.

12. An image processing device comprising:
a target pixel detector configured to detect a plurality of target pixels in which noise is generated among a plurality of pixels included in an image sensor;
a target pixel corrector configured to change target pixel values of the plurality of target pixels, by using average pixel values of contact pixels contacted in a horizontal direction based on a position of each of the plurality of target pixels; and
a target pixel compensator configured to compensate for the target pixel values based on sum values of pixel values of the contact pixels,
wherein the target pixel compensator comprises:
an accumulation value manager configured to generate an accumulation value increased by one (1) in response to odd sum values among the sum values; and
a compensation determiner configured to determine at least one compensation pixel to which a predetermined compensation value is added among the plurality of target pixels based on the accumulation value.

13. The image processing device of claim 12,
wherein the target pixel corrector is configured to change the target pixel values into integer part of the average pixel values.

14. The image processing device of claim 12, wherein the target pixel compensator further comprises:
a sensor configured to sense an increase of the accumulation value.

15. The image processing device of claim 14,
wherein the compensation determiner is configured to determine a target pixel corresponding to a sum value for increasing the accumulation value from an odd number to an even number as the compensation pixel.

16. The image processing device of claim 14,
wherein the compensation determiner is configured to randomly determine the compensation pixel according to a ratio determined based on the accumulation value.

17. A method of operating an image processing device, the method comprising:
receiving pixel values of a plurality of pixels indicating an image;
changing a pixel value of a first target pixel by using an average pixel value of neighboring pixels included in a predetermined range of the first target pixel in which noise is generated among the plurality of pixels;
obtaining a first decimal fraction value which is a value corresponding to a decimal fraction part of an average pixel value corresponding to the first target pixel;
changing a pixel value of a second target pixel by using an average pixel value of neighboring pixels included in a predetermined range of the second target pixel in which the noise is generated among the plurality of pixels;
generating an accumulation value obtained by accumulating a second decimal fraction value which is a value corresponding to a decimal fraction part of an average pixel value corresponding to the second target pixel and the first decimal fraction value; and
compensating for the pixel value of the first target pixel or the pixel value of the second target pixel based on the accumulation value,
wherein compensating for the pixel value of the first target pixel or the pixel value of the second target pixel comprises:
selecting any one of the first target pixel and the second target pixel; and
adding one (1) to the pixel value of the any one selected target pixel when the accumulation value is greater than or equal to a predetermined reference value, and subtracting one (1) from the accumulation value.

18. The method of claim 17,
wherein selecting the any one of the first target pixel and the second target pixel comprises adding zero (0) to the pixel value of the any one selected target pixel when the accumulation value is less than the reference value.

19. The method of claim 18, further comprising:
compensating for a pixel value of a third target pixel in which the noise is generated among the plurality of pixels when the accumulation value is less than the reference value,
wherein compensating the pixel value of the third target pixel comprises:
changing the pixel value of the third target pixel by using an average pixel value of neighboring pixels included in a predetermined range of the third target pixel;
generating an additional accumulation value obtained by accumulating a third decimal fraction value, which is a value corresponding to a decimal fraction part of an average pixel value corresponding to the third target pixel, and the accumulation value; and
adding a compensation value determined based on the accumulation value to the pixel value of the third target pixel.

20. A method of operating an image processing device, the method comprising:
receiving pixel values of a plurality of pixels indicating an image;
detecting a plurality of target pixels in which noise is generated among the plurality of pixels;
calculating sum values of pixel values of contact pixels contacted in a vertical direction based on a position of each of the plurality of target pixels;
changing target pixel values by using respective average pixel values of the sum values;
generating an accumulation value increased by one (1) in response to odd sum values among the sum values;
determining a compensation pixel in response to changing the accumulation value from an odd number to an even number among the plurality of target pixels; and adding a predetermined compensation value to the pixel value of the compensation pixel.

21. An image processing device comprising:
an image sensor configured to transmit pixel values of first pixels indicating an image;
a target pixel detector configured to detect second pixels in which noise is generated among the first pixels based on the pixel values of the first pixels;
a target pixel corrector configured to change pixel values of the second pixels by using average pixel values of third pixels respectively determined according to positions of the second pixels in the image;
a target pixel compensator configured to:
  an accumulation value obtained by accumulating values corresponding to a decimal fraction part of the average pixel values,
  determine compensation pixels among the second pixels based on the accumulation value, and
  compensate for pixel values of the compensation pixels by adding a compensation value which is determined based on the accumulation value; and
an output manager configured to output the pixel values of the first pixels including the second pixels in which the pixel values are compensated.

* * * * *